United States Patent [19]
Yoshida

[11] Patent Number: 5,504,863
[45] Date of Patent: Apr. 2, 1996

[54] CENTRALIZED NETWORK MONITORING DEVICE FOR MONITORING DEVICES VIA INTERMEDIATE MONITORING DEVICES BY MEANS OF POLLING AND INCLUDING DISPLAY MEANS DISPLAYING SCREENS CORRESPONDING TO HEIRARCHIC LEVELS OF THE MONITORED DEVICES IN A NETWORK

[75] Inventor: Kojun Yoshida, Kawasaki, Japan

[73] Assignee: Fujitsu Limited, Kanagawa, Japan

[21] Appl. No.: 298,384

[22] Filed: Aug. 30, 1994

[51] Int. Cl.$^6$ .............................. G06F 11/30; G06F 11/00
[52] U.S. Cl. .................... 395/184.01; 395/160; 395/153
[58] Field of Search .................. 395/183.01, 183.02, 395/183.06, 183.07, 183.15, 183.22, 184.01, 153, 160, 161; 345/1, 2; 340/52 F, 52 R

[56] References Cited

U.S. PATENT DOCUMENTS

| | | | |
|---|---|---|---|
| 4,635,030 | 1/1987 | Rauch | 340/52 F |
| 4,672,529 | 6/1987 | Kupersmit | 364/130 |
| 5,049,873 | 9/1991 | Robins et al. | 340/825.06 |
| 5,182,744 | 1/1993 | Askew et al. | 370/16 |
| 5,420,977 | 5/1995 | Sztipanovits et al. | 395/160 |

FOREIGN PATENT DOCUMENTS

| | | |
|---|---|---|
| 0085437 | 8/1983 | European Pat. Off. . |
| 6120948 | 4/1994 | Japan . |

*Primary Examiner*—Hoa T. Nguyen

[57] ABSTRACT

The fault occurrence statuses of each device being monitored and the intermediate monitoring device under which the devices at which faults have occurred are stored in a table, and when the desired screen is selected and displayed based on a map information file, the number of collected faults of each of the devices displayed on the selected screen is displayed in accordance with the above-noted fault occurrence status table. In addition, the invention has a verification status table into which is stored the information as to whether or not detailed fault information for the devices being monitored has been verified, with correspondence established with respect to the upstream intermediate monitoring devices, and displays whether or not faults of each of the devices at each of the heirarchical levels of the network have or have not been verified, in accordance with this verification status table. In addition, the existence of a fault state device which is not shown on the display screen is indicated within that display screen, and further the size of the display screen can be changed to bring that fault state device onto the display screen.

6 Claims, 12 Drawing Sheets

| DISPLAY DEVICE ADDRESS | DISPLAY X COORDINATE | DISPLAY Y COORDINATE |
|---|---|---|
| 01- 01 | 245 | 328 |
| 01- 02 | 100 | 200 |
| 01- -- | --- | --- |

CENTRALIZED NETWORK MONITORING DEVICE FOR MONITORING DEVICES VIA INTERMEDIATE MONITORING DEVICES BY MEANS OF POLLING AND INCLUDING DISPLAY MEANS DISPLAYING SCREENS CORRESPONDING TO HEIRARCHIC LEVELS OF THE MONITORED DEVICES IN A NETWORK

BACKGROUND OF THE INVENTION

1. Field of the Invention

The present invention relates to a centralized network monitoring device, and more specifically to a centralized network monitoring device which monitors a device being monitored via intermediate monitoring apparatuses and displays the monitoring results on a screen.

2. Description of the Related Art

In a centralized monitoring network in which the device being monitored is a transmission device, the NEs (network elements) which are the devices being monitored are connected to the X-SV (extensive supervisor) which is the centralized monitoring device, via the P-SVs (primary supervisors) and R-SVs (regional supervisors) which are intermediate monitoring devices. The X-SV performs constant monitoring and information collection of the state of the NE devices being monitored by the processing device PC therein. The monitoring results are displayed on a CRT display device.

In a centralized monitoring network such as this, as the number of devices NE being monitored increases, it is desirable to perform monitoring at the centralized monitoring device X-SV by means of a display screen that is as easy to understand and as accurate as possible.

However, in prior art centralized network monitoring devices such as this, if a large number of faults occur simultaneously in devices being monitored, problems exist in that it is not possible to know for each hierarchic level of the network how many faults have occurred at which devices, nor is it possible to ascertain the reset statuses of the faults.

In addition, because it was difficult to tell whether or not detailed information regarding a fault in a device being monitored has been verified, the problem arose of unnecessarily selecting and displaying screens, as does the further problem of the operator not being able to know of a fault occurring in a device located in a part that is not displayed.

SUMMARY OF THE INVENTION

Therefore, an object of the present invention is, in a centralized network monitoring device which provides a screen display of the results of monitoring the devices being monitored via intermediate monitoring devices by means of polling, to not only make it easy to know the fault status of each device at each heirarchical level in the network, but also to make it possible to know whether or not detailed fault information for the devices being monitored has been verified and to provide notification of faults in devices not displayed.

To achieve the above-noted objects, the centralized network monitoring device of the present invention has a fault occurrence status table into which the fault status of each of the devices being monitored are collected by means of polling and are stored with correspondence established with the intermediate monitoring devices upstream from each of the devices being monitored, and a map information file into which is stored the address and coordinates of each device located on the maps of each of the display screens that correspond to the heirarchal levels of the network, and additionally when the desired screen is selected and displayed based on the above-noted map information file, the number of collected faults of each of the devices displayed on that selected screen is displayed in accordance with the above-noted fault occurrence status table.

In the above-described present invention, it is possible to display the above-noted screens in an overlapping manner, and to bring any of the screens to the display foreground with a single action.

In addition, the above-described present invention further has a verification status table into which is stored the information as to whether or not detailed fault information for the devices being monitored has been verified, with correspondence established with respect to the intermediate monitoring devices, and the present invention is capable of displaying whether or not the faults of each device displayed on the desired screen have been verified, in accordance with the above-noted verification status table.

In addition, in the above-noted present invention, it is also possible to display on the desired screen the existence of a fault in a device that is not displayed on that screen.

In addition, in the above-noted present invention, it is also possible to make it possible to vary the size of the screen so that a device which is in the fault state is displayed within the desired screen.

BRIEF DESCRIPTION OF THE DRAWINGS

The present invention will be more clearly understood from the description as set forth below with reference to the accompanying drawings.

DESCRIPTION OF THE PREFERRED EMBODIMENTS

Figure 1:
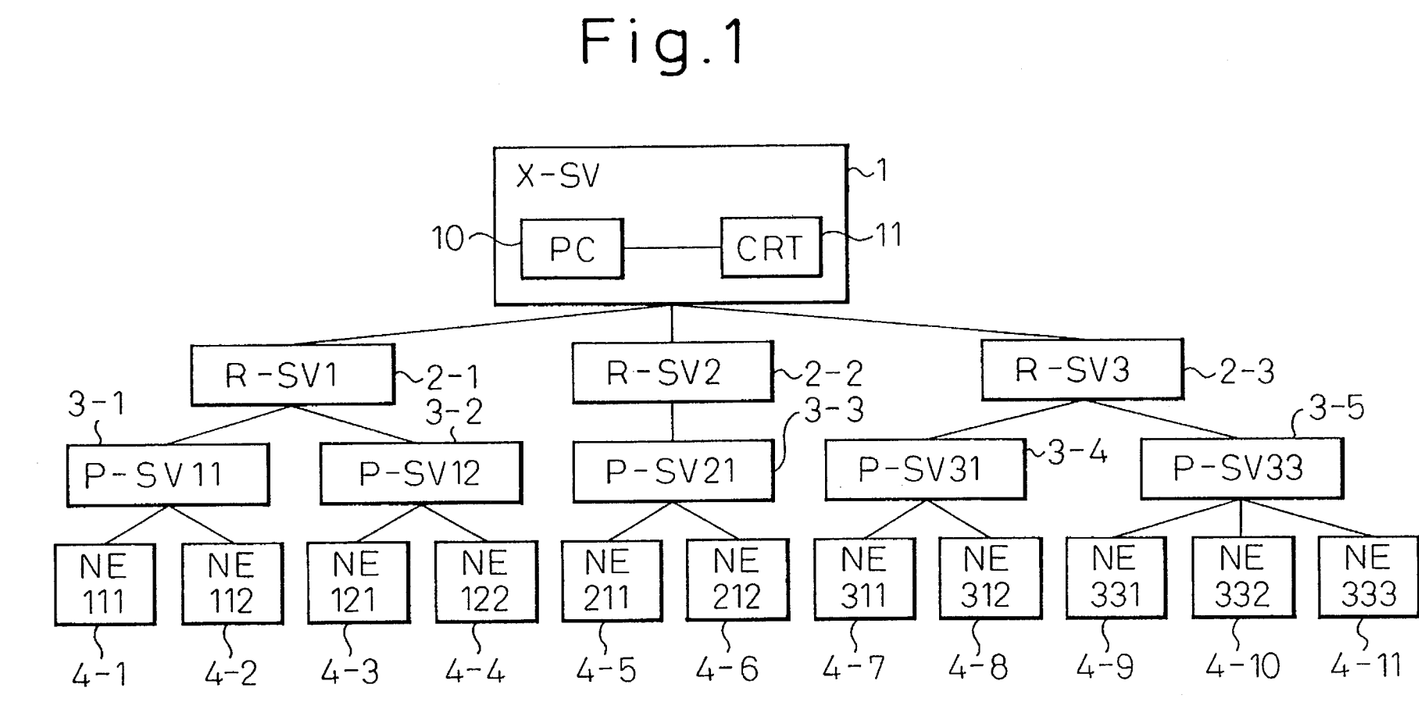
FIG. 1 is a block diagram which shows a centralized monitoring network which applies to the present invention and to previous examples.
Figure 2:
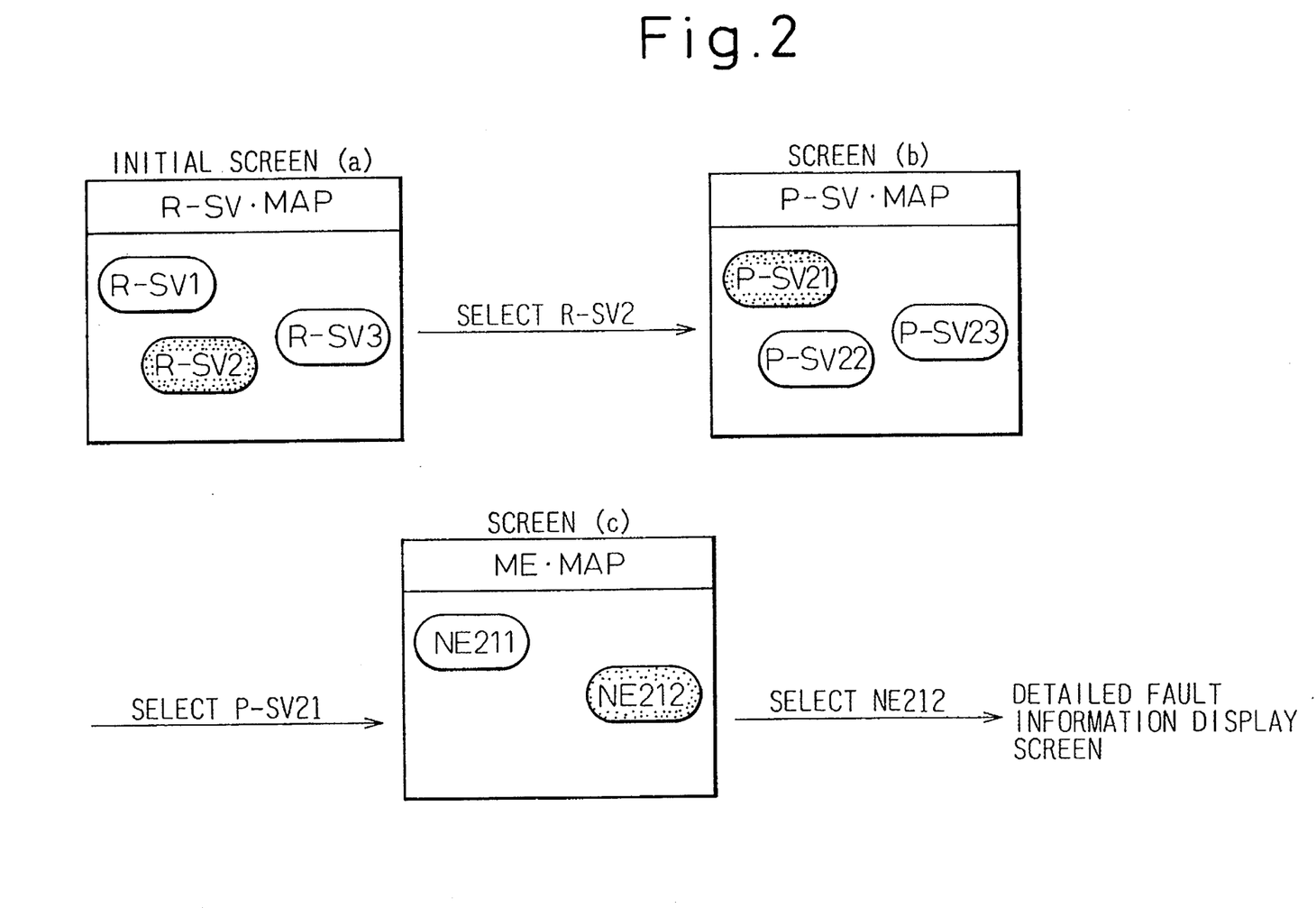
FIG. 2 is a block diagram which shows an example of the monitoring display screen in a previous centralized network monitoring device.

Before describing the preferred embodiments according to the present invention, examples of the related art are provided with reference to FIGS. 1 and 2.

FIG. 1 shows a centralized monitoring network in which the device being monitored is a transmission device. The NEs (network elements) 4-1 to 4-11 which are the devices being monitored are connected to the XSV (extensive supervisor) 1 which is the centralized monitoring device, via the P-SVs (primary supervisors) 3-1 to 3-5 and R-SVs (regional supervisors) 2-1 to 2-3 which are intermediate monitoring devices, with constant monitoring and information collection of the state of the NE devices being monitored being performed by the processing device PC 10 provided at the centralized monitoring device X-SV 1, the monitoring results being displayed on a CRT 11 display device.

In a centralized monitoring network such as this, as the number of devices being monitored NE increases, it is desirable to perform monitoring at the centralized monitoring device X-SV by means of a display screen that is as easy to understand and as accurate as possible.

In a centralized monitoring network such as shown in FIG. 1, the centralized monitoring in the centralized monitor network is performed by the processing device PC 10 in the centralized monitoring device X-SV on the display device, which has a high-accuracy graphic screen, as follows.

First, the initial screen (a) shown in FIG. 2 is displayed on the display device CRT. This initial screen (a) is the screen at the intermediate monitoring devices R-SV, which are at the most upstream hierarchic level as viewed from the X-SV centralized monitoring device, and, as shown in the drawing, the 3 intermediate monitoring devices R-SV1 to R-SV3 for example are displayed according to their location on the map.

For devices being monitored NE located under the intermediate monitoring devices R-SV in which a fault has occurred, the display color is changed to indicate this to the operator, and in this example a fault at a device under the intermediate monitoring device R-SV2 has occurred and is being reported.

In such an initial screen (a), if the intermediate monitoring device R-SV2 which is of a changed color is selected, the intermediate monitoring devices P-SV which are below the intermediate monitoring device R-SV2 are displayed as in screen (b) according to their location on the map. In this case, the color of the intermediate monitoring device P-SV21 below which is located a device being monitored exhibiting a fault is displayed with a different color.

Therefore, if the operator further selects this intermediate monitoring device P-SV, as shown at screen (c), a map related to the devices being monitored NE is displayed, with the device being monitored NE212 is displayed with a different color to indicate that it has a fault.

Therefore, finally the operator selects a device being monitored NE212 to display on the screen detailed information with regard to the fault in the device being monitored NE212.

In prior art centralized network monitoring devices such as this, if a large number of faults occur simultaneously in devices being monitored, problems exist in that it is not possible to know for each hierarchic level of the network how many faults have occurred at which devices, nor is it possible to ascertain the reset statuses of the faults.

In addition, because it was difficult to tell whether or not the detailed information regarding a fault in a device being monitored has been verified, the problem arose of unnecessarily selecting and displaying screens, as does the further problem of the operator not being able to know of a fault occurring in a device located in a part that is not displayed.

Next, the centralized network monitoring device of the present invention will be explained. Since the centralized network monitoring device of the present invention corresponds to the centralized monitoring device X-SV shown in FIG. 1 and can use an overall network configuration similar to that of FIG. 1, reference will be made to the network of FIG. 1 in the description that follows.

Figure 3:
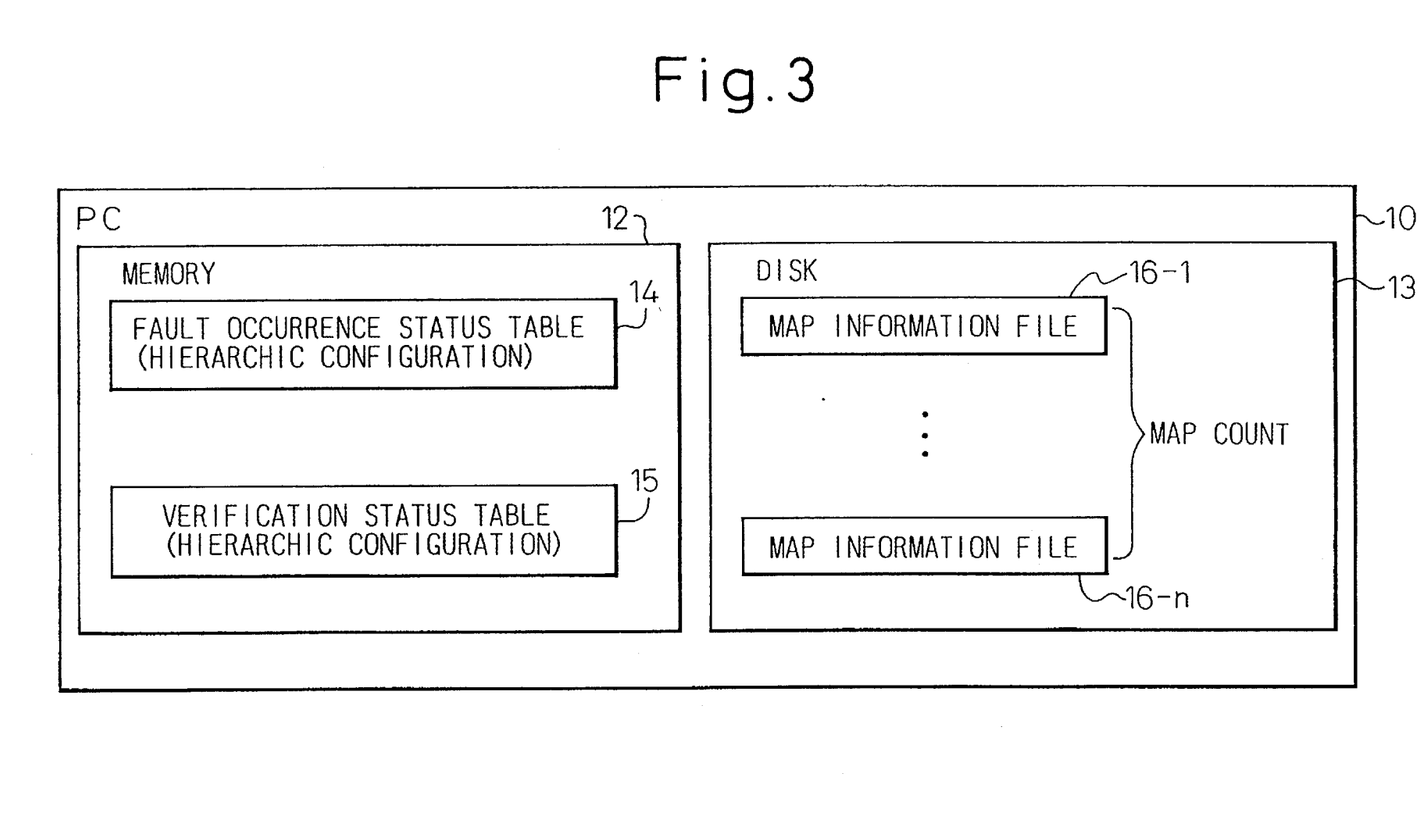
FIG. 3 is a block diagram which shows basic components of the present invention.

FIG. 3 shows a basic configuration of the invention. In FIG. 3, the fault occurrence status table 14 and the verification status table 15 are in a memory 12 of the PC 10. The fault occurrence status table 14 is monitoring the condition of fault occurrence, and the verification status table 15 is monitoring the situation of verification. The map information files 16-1 to 16-n (n: a map count) are in the disk 13 of the PC 10, and store the location data of devices in respective maps. Using the fault occurrence status table 14, verification status table 15 and map information files 16-1 to 16-n, respective maps are displayed.

In the centralized network monitoring device of the present invention, devices NEs being monitored are monitored via intermediate monitoring devices R-SV and P-SV by means of polling, and the monitoring results are stored into a fault occurrence status table 14, with storage also being performed into a fault occurrence status table 14 of not only these NE devices being monitored but also of the intermediate monitoring devices R-SV and P-SV which are upstream from each of the devices NEs being monitored which are in the fault state.

In addition, into the map information files 16-1 to 16-n are stored the addresses and coordinates which indicate how each of the devices is located within the maps of the display screens which correspond to each of the heirarchal levels of the network.

Therefore, in such a centralized network monitoring device, in addition to the selection and display of the screen desired by the operator according to the above-noted map information files 16-1 to 16-n, the overall faults of the devices NEs being monitored or intermediate monitoring devices R-SV and P-SV on the thus-displayed desired screen are displayed in accordance with the above-noted fault occurrence table 15.

In this manner, the occurrence of faults and reset statuses of each device on each heirarchal level of the network can be indicated to the operator.

It is possible for the operator to obtain an overlapping display of the above-noted screen, to select any one of the screens for foreground display by a single action, and to perform display screen switching quickly and simply, thereby making it possible to quickly and easily know the details of faults in devices being monitored.

In addition, the verification status table 15 is not only used to store verification of detailed fault information for the NE devices being monitored, but also to store the status of the corresponding upstream intermediate monitoring devices R-SV and P-SV of the verified devices being monitored, and by providing such a verification status table 15, it is possible to display on the desired screen whether or not verification has been made of the faults of each device, thereby enabling a judgment to be made with regard to for which devices such detailed fault information has been verified, thereby eliminating unnecessary verification operations.

In addition, not only can the existence of NE devices being monitored in the fault state or corresponding intermediate monitoring devices R-SV and P-SV which are not within the above-noted desired screen by being displayed on the above-noted desired screen, but also by enabling the change of the size of that screen, it is possible for the operator to further determine with ease where a fault has occurred.

Figure 4:
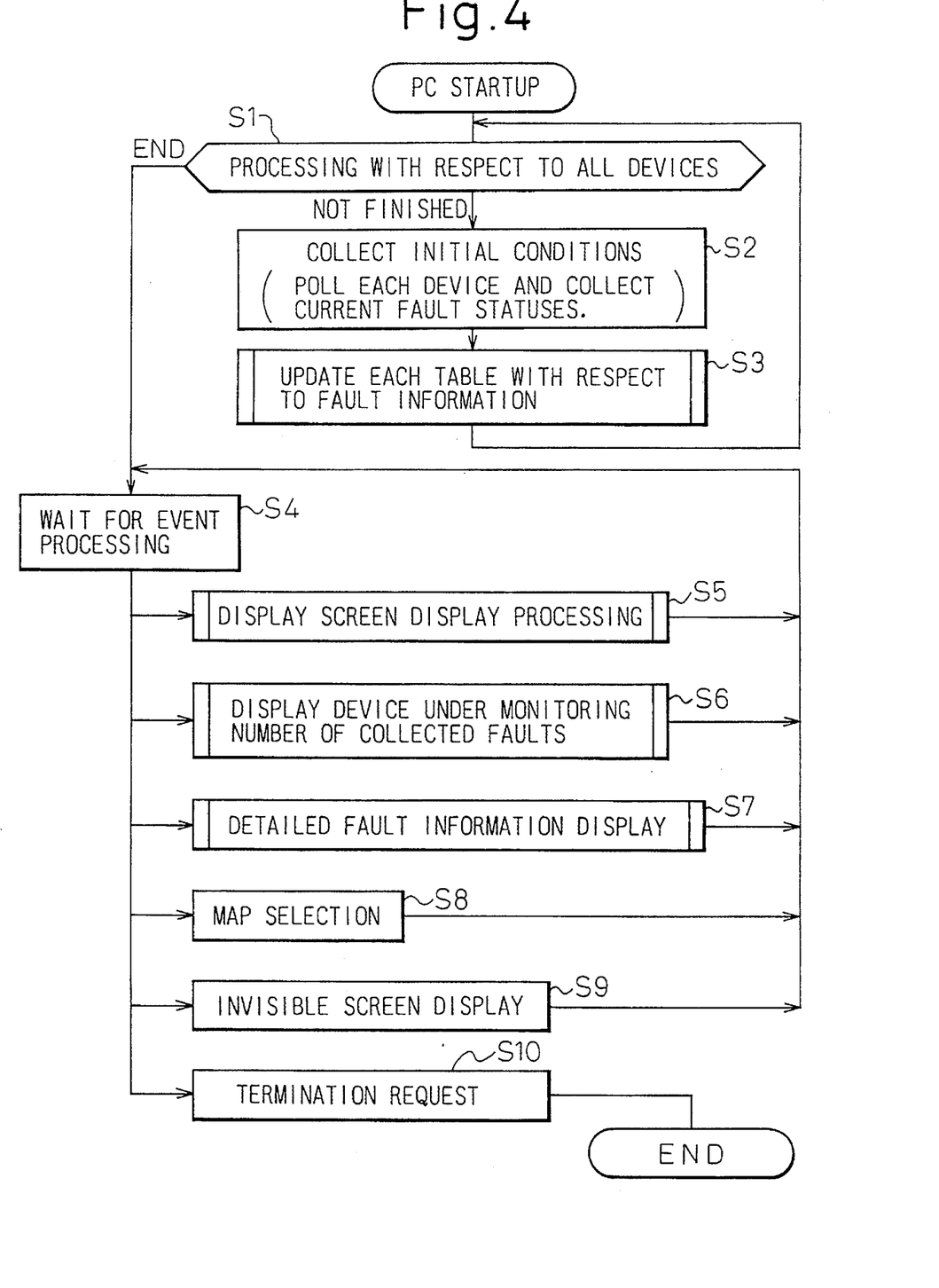
FIG. 4 is a flowchart which shows the overall flow of processing in the centralized network monitoring device of the present invention.

FIG. 4 is a flowchart which shows the overall flow of processing in the centralized network monitoring device X-SV of the present invention, and the operation of the present invention will be described below by following this flowchart.

First, the processing device PC 10 of the centralized monitoring device X-SV 1 shown in FIG. 1 is started up, and polling is performed via the intermediate monitoring devices R-SV 2-1 to 2-3 and P-SV 3-1 to 3-5 of the current fault status of all NE devices 4-1 to 4-11 being monitored (step S2). This is performed for all devices being monitored (step S1).

Figure 5:
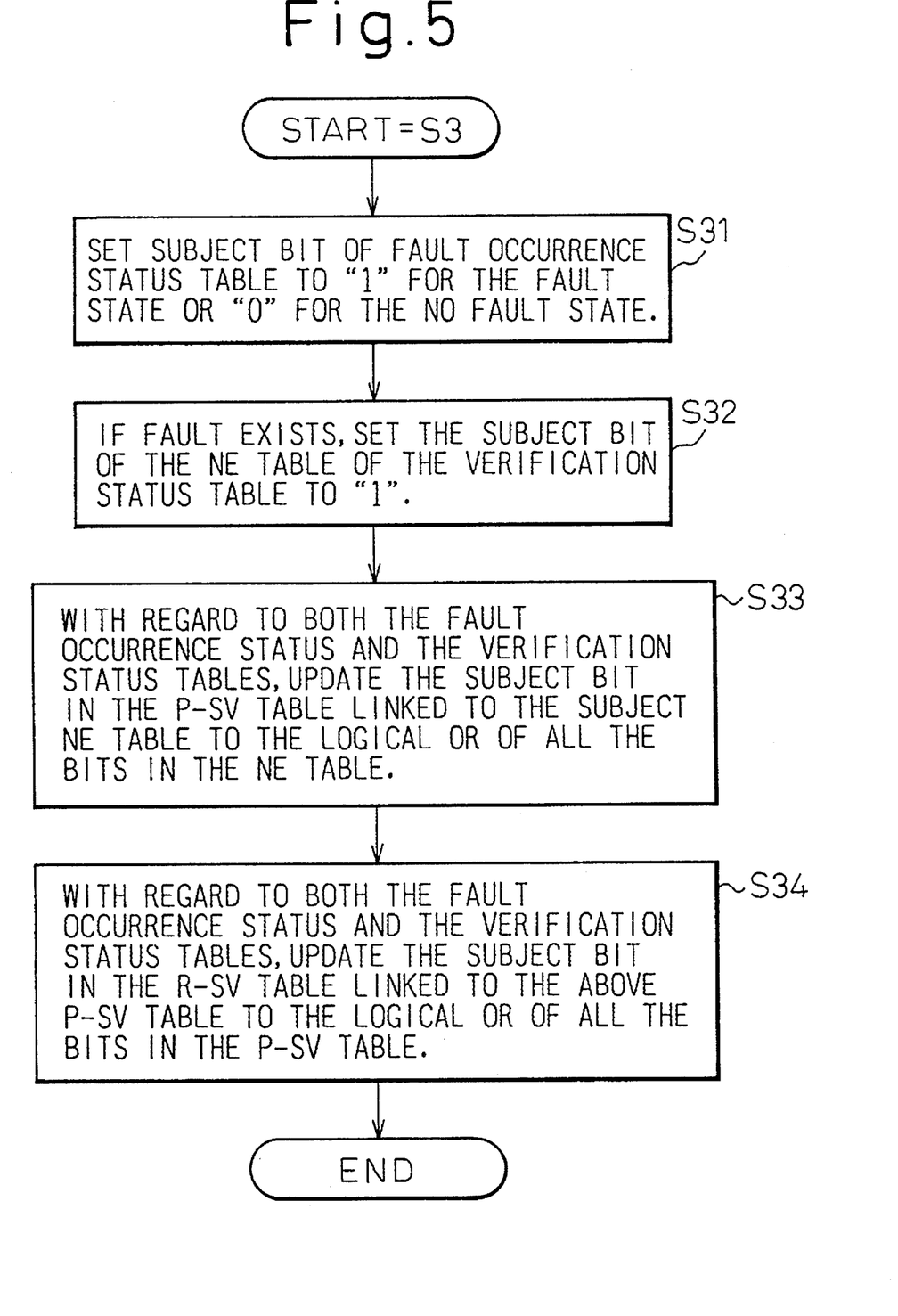
FIG. 5 is a flowchart which shows the processing for the updating of each of the tables in the centralized network monitoring device of the present invention.

Next, for the fault information collected as described above, each table is updated (step S3). This step S3 forms a subroutine, the actual processing performed therein being shown in FIG. 5.

Figure 6:
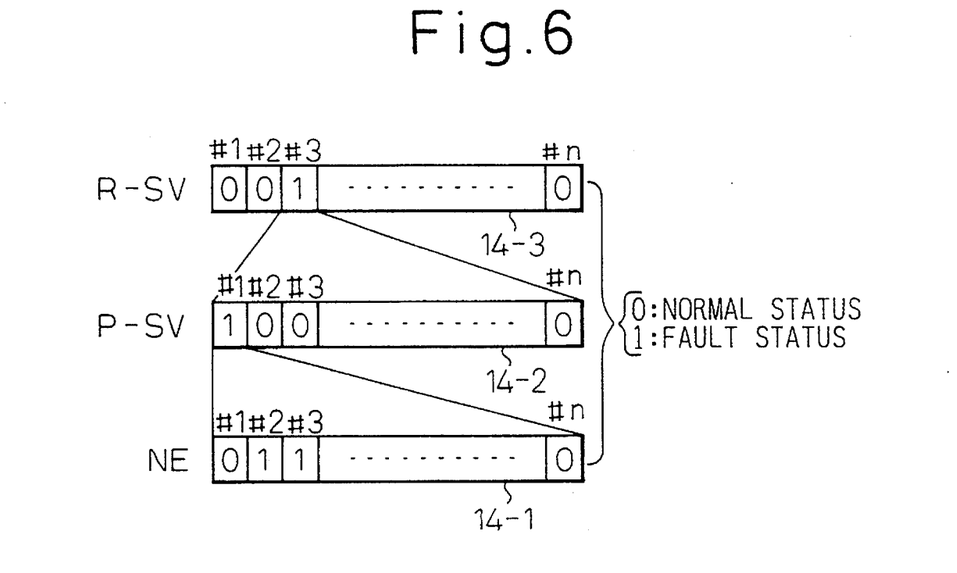
FIG. 6 shows the fault occurrence status table used in the centralized network monitoring device of the present invention.

That is, the bits of the devices being monitored table (NE table) 14-1, which is provided within the processing device PC 10 and shown in FIG. 6, are set to "1" if the result of polling indicates the existence of a fault, or reset to "0" if the results of polling indicate no fault (Step S31).

Figure 7:
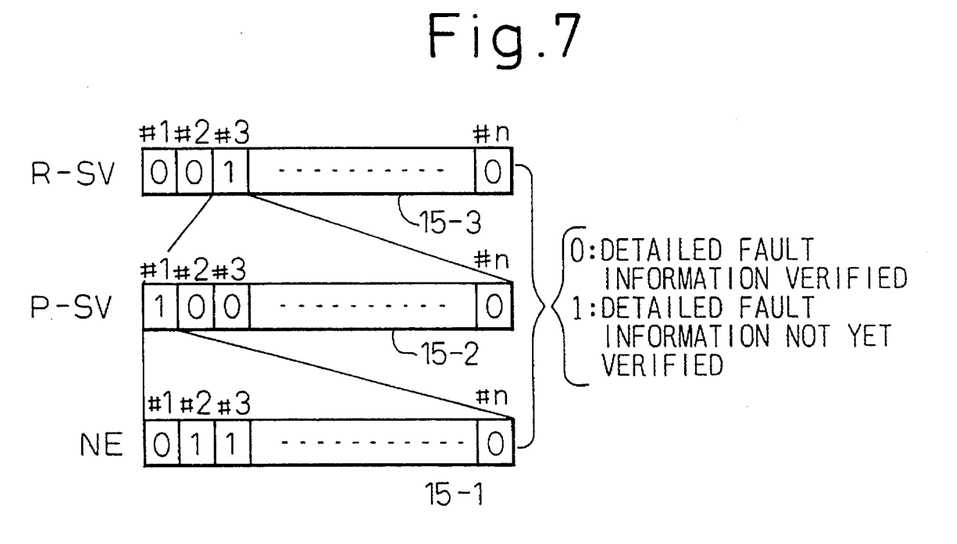
FIG. 7 shows the fault occurrence status verification status table in the centralized network monitoring device of the present invention.

At the processing device PC 10, in addition to the fault occurrence status table 14, a fault occurrence status verification status table 15 shown in FIG. 7 is provided, and in the case in which the existence of a fault is indicated in the above-noted step S31, the bit in the NE table 15-1 of the verification status table 15 is set to "1," and as described later the condition in which the detailed fault information for the device being monitored NE has not yet been verified is set as the initial status (step S32).

In this manner, appropriate bits for the upstream intermediate monitoring devices R-SV 2-1 to 2-3 corresponding to the intermediate monitoring devices PSV 3-1 to 3-5 are updated. This updated value is obtained by taking the logical OR of all the bits of the NE table 14-1 (step S33).

In the same manner, the bits of the intermediate monitoring devices R-SV 2-1 to 2-3 which are upstream from the intermediate monitoring devices P-SV 3-1 to 3-5 are updated. This updating is also done by taking the logical OR of all bits of the P-SV table 14-2 (step S4).

Returning to FIG. 4, after all the updating is done for the fault occurrence status table 14 and verification status table 15 for all devices being monitored NE 4-1 to 4-11, the intermediate monitoring devices P-SV 3-1 to 3-5 and R-SV 2-1 to 2-3, the processing device PC 10 goes into the state in which it waits for operator processing (an event) (step S4).

Thereafter, the first processing performed by the operator is screen display processing (step S5).

Figure 8:
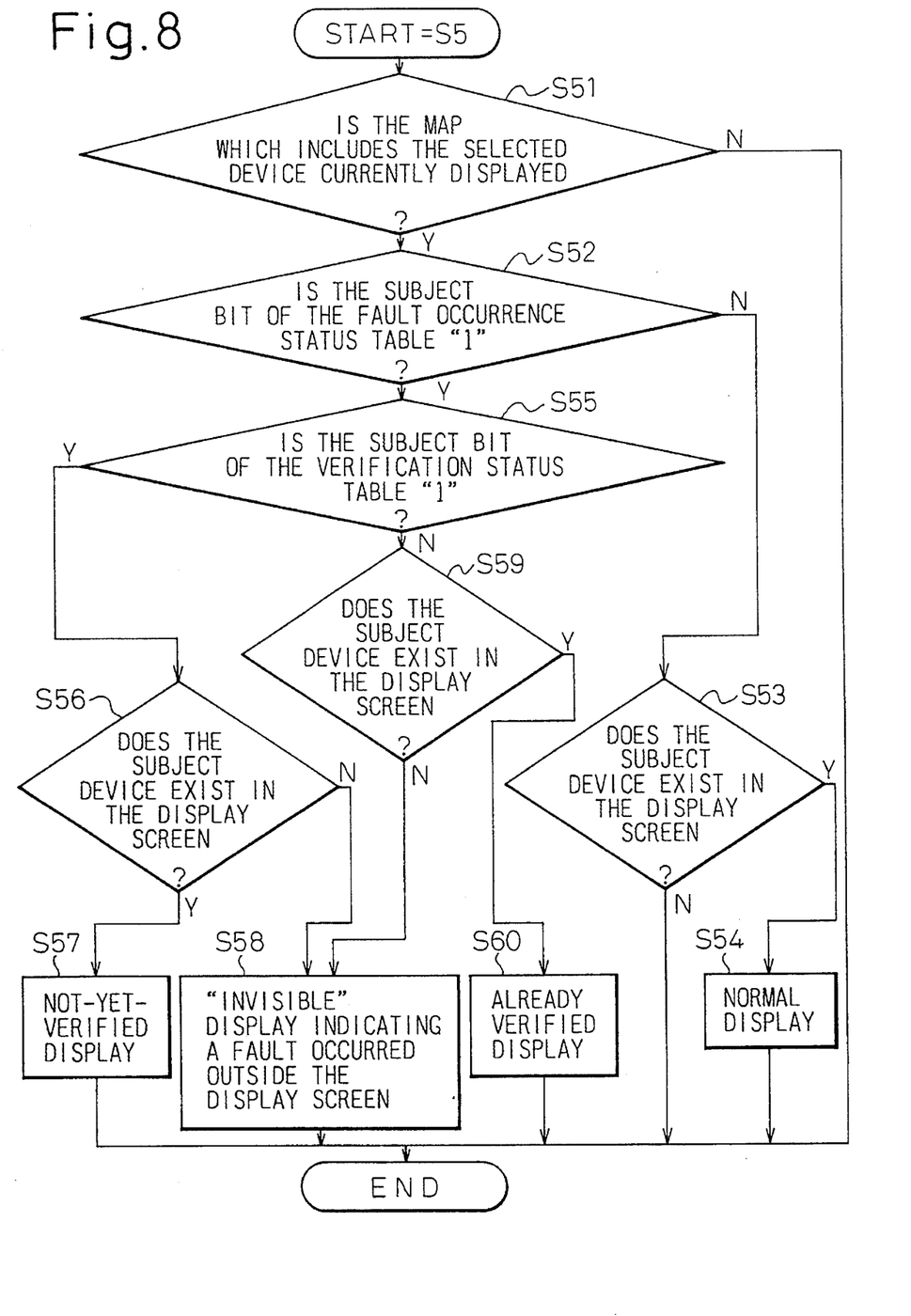
FIG. 8 is a flowchart which shows the display screen processing in the centralized network monitoring device of the present invention.

This step S5 also forms a subroutine, the actual processing performed therein being shown in FIG. 8.

That is, when the operator selects the desired device being monitored NE, or intermediate monitoring device P-SV or R-SV, a judgment is made as to whether or not the map which includes the thus selected device is currently being displayed (step S51). One example is the initial screen (a) shown in FIG. 2, and a judgment is made as to whether this initial screen (a) is being displayed, and thereafter whether or not the selected screen is being displayed. In this case, the relationship between the devices and the maps can be judged by means of the map information files 16-1 to 16-n provided with the processing device PC 10, one example of this map information file being shown in FIG. 9, the address and X and Y coordinates of the displayed devices being stored into this file beforehand.

As a result, in the case in which the map which includes the subject devices (being each of the devices on each heirarchal level of the network) is being displayed, a judgment is made as to whether the bit of the fault occurrence status table 14 corresponding to this device is "1", that is, as to whether or not a fault exists (step S52).

As a result, if the subject bit in the fault occurrence status table 14 is not "1", a judgment is made as to whether or not the subject device exists within the display screen (step S53), and if the subject device exists within the display screen, a normal display of this is made (step S54). In this case as well, the relationship between the device and the map is judged by means of the map information files 16-1 to 16-n which are provided within the processing device PC 10.

Figure 10:
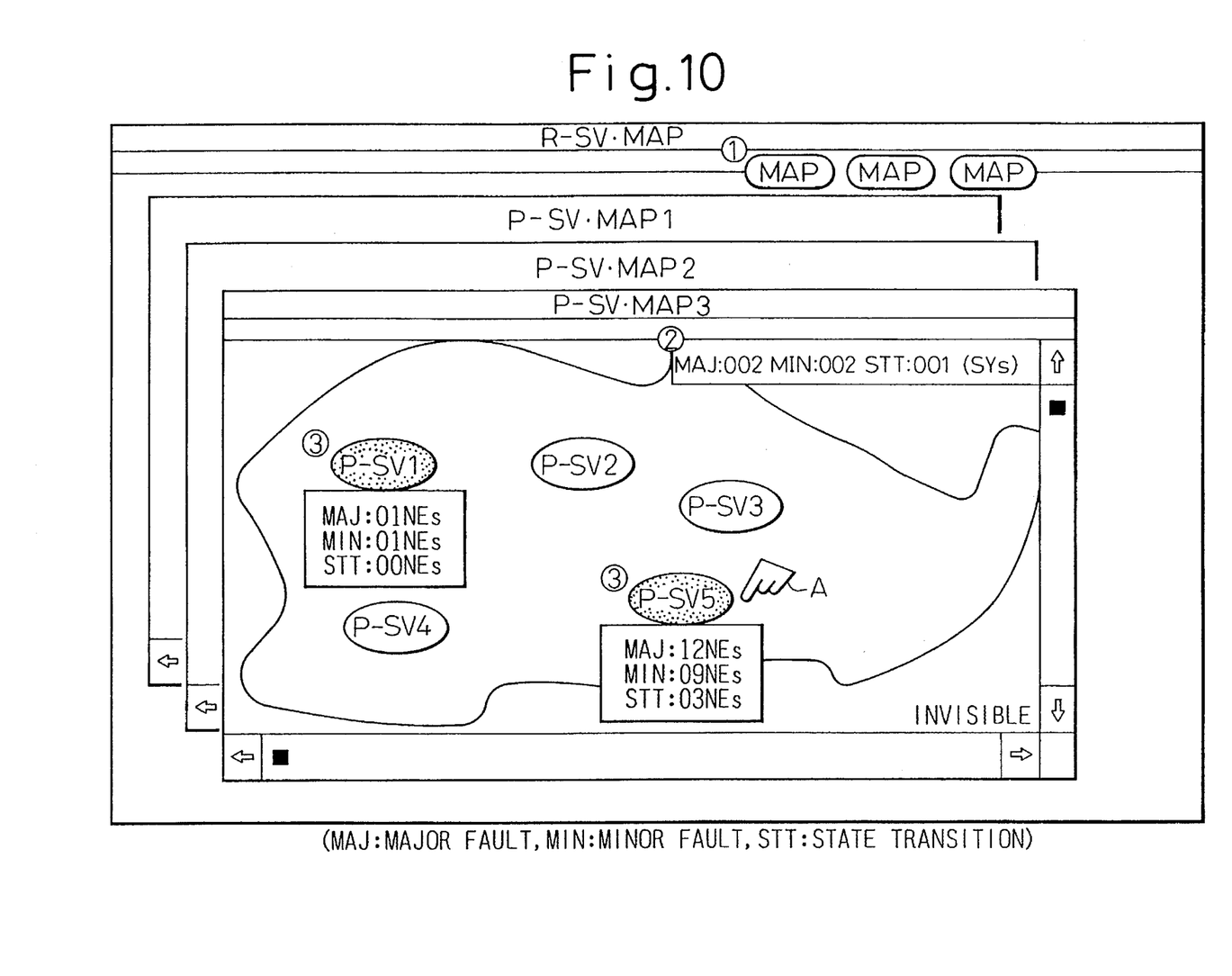
FIG. 10 shows an example of the display screen displayed in the centralized network monitoring device of the present invention.

An example of the screen display in this case is shown in FIG. 10, and in this example, by continuously selecting the subject device and executing steps S51, S53, and S54, in the intermediate monitoring device R-SV screen as shown in FIG. 2, a number of overlapping intermediate monitoring device P-SV screens are displayed.

In step S52, in the case in which the subject bit of the fault occurrence status table 14 is "1" which indicates the occurrence of a fault, a further judgment is performed with regard to whether or not the corresponding bit in the verification status table 15 is "1" (step S55).

Figure 9:
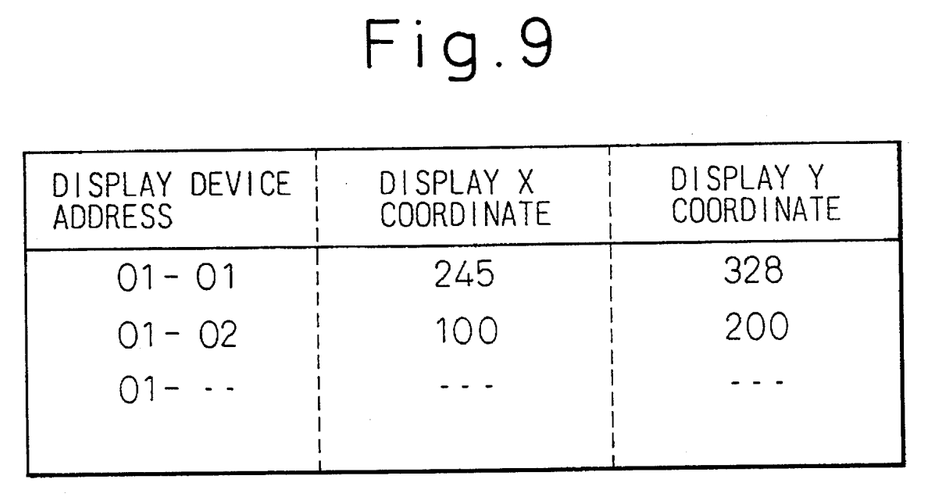
FIG. 9 shows an embodiment of the map information file used in the centralized network monitoring device of the present invention.

As a result, if the subject bit of the verification status table 15 is "1", because this indicates that verification of the detailed fault information for the device being monitored has not yet been performed, after a determination of whether or not this subject device is included within the current display screen is made, based on the map information file of FIG. 9 (step S56), if it does exist within the display screen, the not-yet-verified data is displayed (step S57).

The display screen in this case, as shown in FIG. 10, is the three overlapping intermediate monitoring device P-SV screens of P-SV MAP 1 to P-SV MAP3, with the P-SV MAP3 screen displayed as the frontmost screen, on which the five intermediate monitoring devices P-SV1 through P-SV5 are displayed, of which only P-SV5 is indicated by means of the hand symbol A as having detailed information for the faults in devices being monitored NE beneath it, which has not been verified.

When the fact that a subject device does not exist within the display screen is known from the map information file of FIG. 9, to indicate the existence of a fault occurring outside the display screen, "INVISIBLE" is displayed (step S58).

This condition is indicated in the lower right of the intermediate monitoring device display screen P-SV MAP3 shown in FIG. 10, thereby indicating to the operator that the subject device has a fault that has occurred that is outside the display screen.

In step S55, in the case in which the subject bit of the verification status table 15 is "0", a judgment is made as to whether or not the subject device exists within the display screen (step S59), and if it does not, step S58 is executed in the same manner as described above, but if it does exist within the display screen, the display indicating that the detailed information concerning the fault of the subject device has already been verified is made (step S60).

This already verified display in the example of FIG. 10 is indicated by the elimination the hand symbol A at the intermediate monitoring device P-SV1 which is displayed with a changed color to indicate the existence of a fault. When the screen display processing (step S5) shown in FIG. 4 is executed in this manner, the operator then executes the display processing of the collected number of faults of the devices being monitored (step S6).

An example of the display of the collected number of faults by means of step S6 is indicated in FIG. 10 below each of the intermediate monitoring devices P-SV1 and P-SV5, the actual processing performed by this subroutine being shown in FIGS. 11(A) and 11(B). Specifically, FIG. 11(A) shows the number of collected faults per device processing, in which, after first clearing the number of faults (step S61), a judgment is made as to whether or not a fault has occurred in any of the devices being monitored (i.e., in any of the devices being monitored NE, or in any of the intermediate monitoring devices P-SV and R-SV), according to the fault occurrence status table 14 (FIG. 6) (steps S62 and S63), and if there is currently a fault that has occurred, the number of faults is incremented (step S64).

Then, after executing steps S62 through S64 for all of the devices being monitored, the number of faults is displayed (step S65).

If we look at this in the case of the example of FIG. 10, this is indicated as the information surrounded by the boxes (3), there being among the devices being monitored beneath intermediate monitoring device P-SV1 1 device being monitored with a major fault (MAJ), and 1 device being monitored with a minor fault (MIN), with the number of devices being monitored NE in which there was a state transition (STT) being 0. Also, at the intermediate monitoring device P-SV5, there are 12 devices being monitored with major faults, 9 with minor faults, and 3 with state transitions.

Figure 11A:
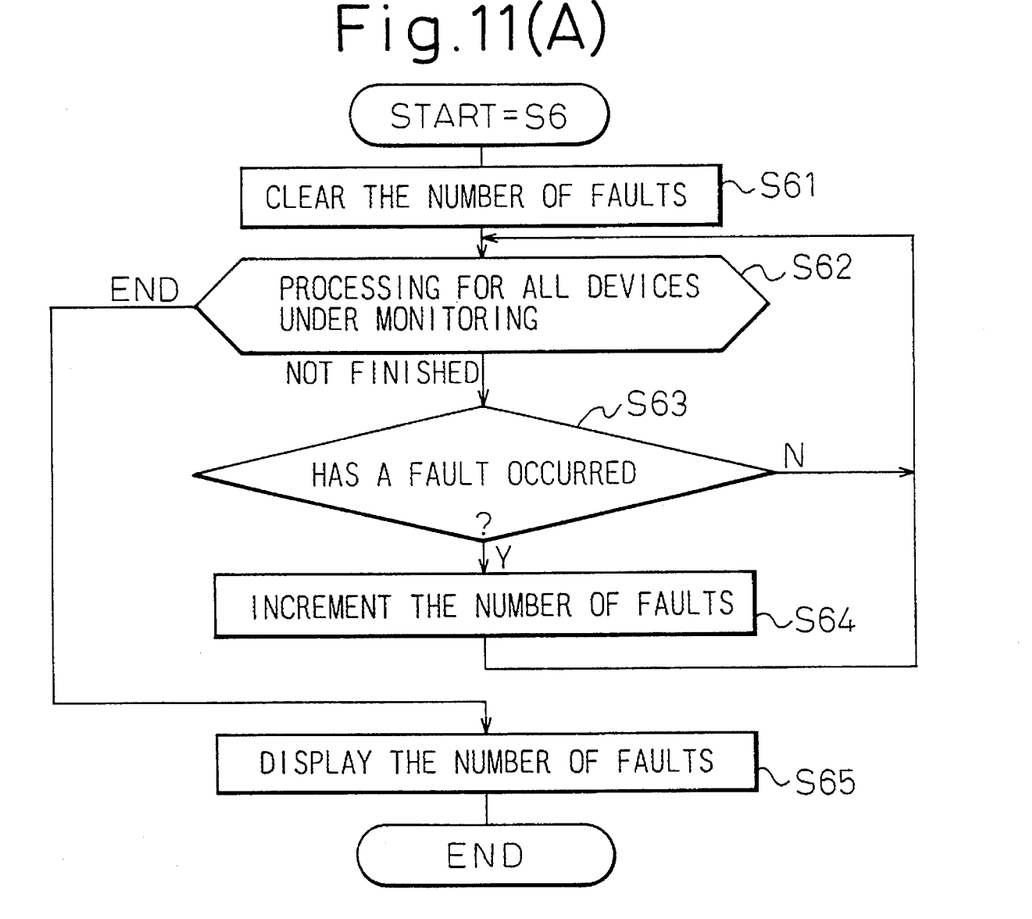
FIG. 11(A) is a flowchart which shows the number of collected faults processing by device in the centralized network monitoring device of the present invention.
Figure 11B:
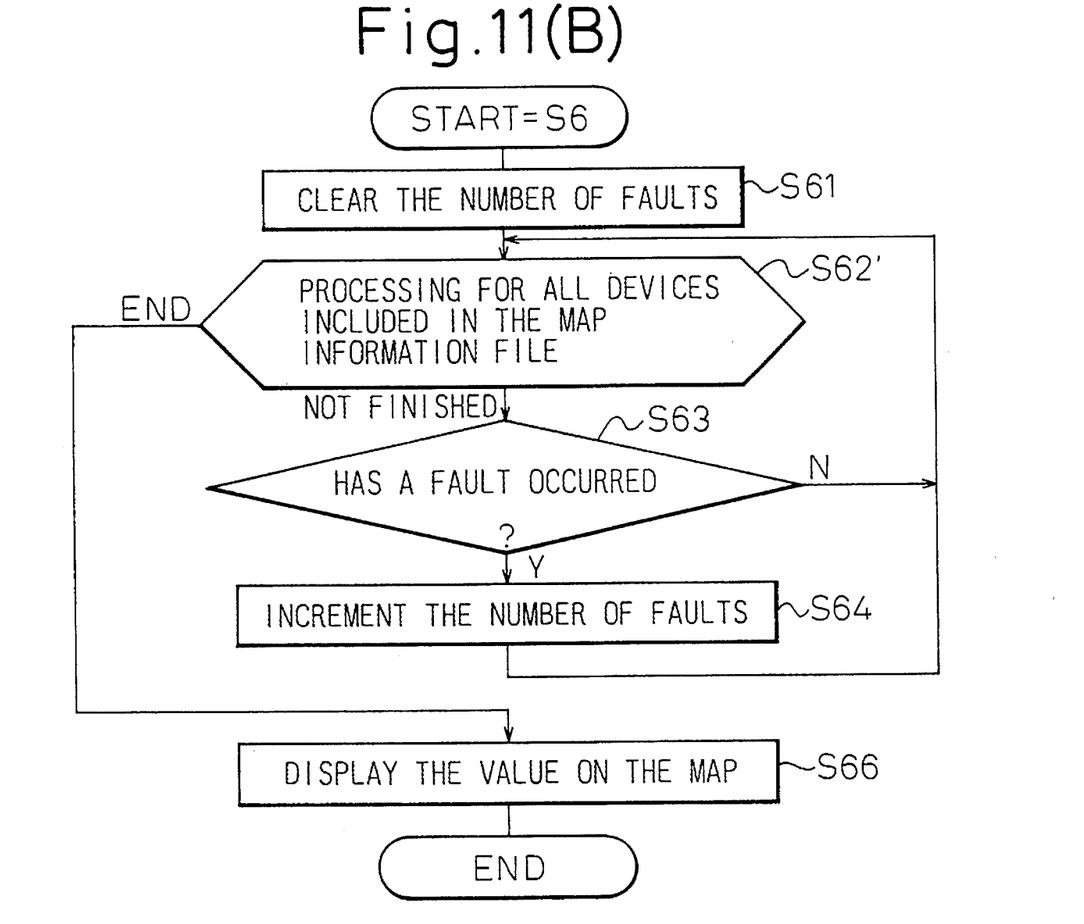
FIG. 11(B) is a flowchart which shows the number of collected faults processing by maps in the centralized network monitoring device of the present invention.

FIG. 11(B) shows the collection processing of the number of faults occurring per MAP, and in the case of the example shown in FIG. 10, the information (2) for the number of collective faults occurring in the screen P-SV MAP3 is indicated, the difference with respect to FIG. 11(A) being that processing is performed with respect to all the devices included in the map information file (step S62'), with that value being displayed on the MAP (step S66), and in FIG. 10 there are major faults (MAJ) in the 2 intermediate monitoring devices P-SV1 and P-SV5, and also minor faults in those 2 intermediate monitoring device, with state transitions in only 1 intermediate monitoring device, P-SV5.

Returning once more to FIG. 4, from the operating processing wait state (step S4) display processing of detailed fault information is executed (step S7).

Figure 12:
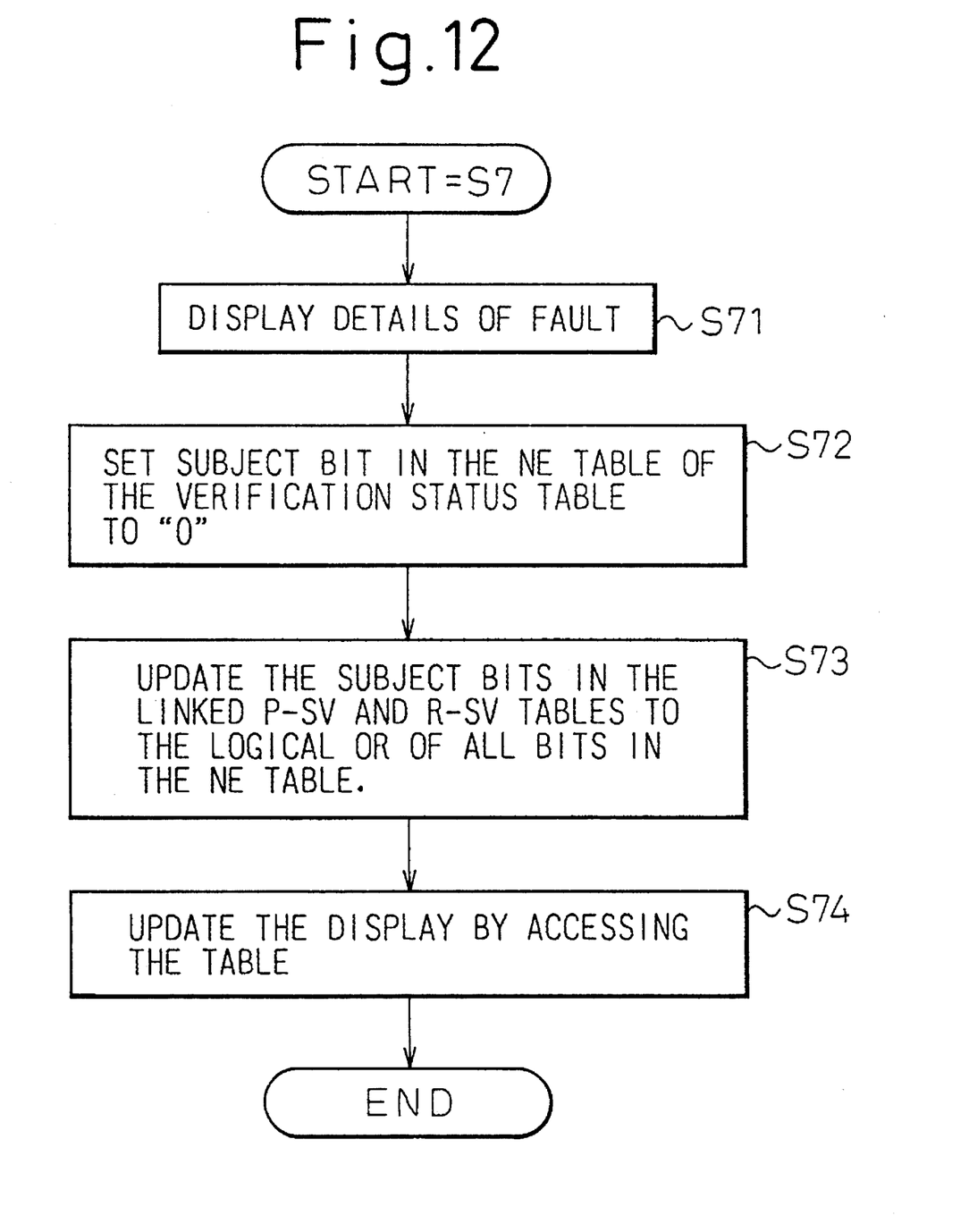
FIG. 12 is a flowchart which shows the detailed fault information display processing in the centralized network monitoring device of the present invention.

This step also forms a subroutine, the actual processing performed therein being shown in FIG. 12, this consisting of first clicking, for example, intermediate monitoring device P-SV1 on the screen shown in FIG. 10, at which point the device being monitored NE screen (c) shown in FIG. 2 is displayed, enabling display of the detailed information with respect to a device being monitored NE included therein by clicking that device being monitored NE (step S71).

Then, the fact that the detailed fault information was displayed and verified in this manner is indicated by setting the corresponding bit within the NE table 151 of the verification status table 15 (FIG. 7) to "0", thereby indicating that detailed fault information has already been verified (step S72).

The corresponding bit in the intermediate monitoring device P-SV table 15-2 corresponding to such a device being monitored having a fault is updated by taking the logical OR of all bits in the device being monitored NE table, while the updating is also done of the upstream intermediate monitoring device R-SV table 15-3 by taking the logical OR of all bits based on the intermediate monitoring device P-SV table (step S73).

After updating the verification status tables 15 in this manner, the screen is updated by accessing these tables (step S74). When doing this, the display screen corresponds to step S60 in FIG. 8, and in the example shown in FIG. 10 non-appearance of the hand symbol at the intermediate monitoring device P-SV1 indicates the "already verified" status.

While the display screens are structured as shown in FIG. 10, in the present invention, as described above, if steps S51, S52, S53, and S54 in FIG. 8 are continuously executed, it is possible to obtain an overlapping display of the screens P-SV MAP1 to P-SV MAP3 related to the downstream intermediate monitoring devices by overlapping with the R-SV MAP screen of the intermediate monitoring device R-SV.

Since the display screen in this case is four frames in total, as shown in the upper right of FIG. 10, there are four pieces of screen-selection information (1), so that if the MAP selection shown in FIG. 4 is executed (step S8), it is possible to bring, for example, the P-SV MAP1 to the foreground with a single action.

In addition, if "INVISIBLE" as displayed in the display processing shown in FIG. 8 (step S58) is displayed, in the example of FIG. 10 this indicates that there exists outside the P-SV MAP3 display screen an intermediate monitoring device P-SV which has beneath it a device being monitored NE that has a fault, and by clicking this "INVISIBLE" it is possible to widen the display screen to display the intermediate monitoring device P-SV related to the fault (step S9 in FIG. 4).

When the operator completes all of the operations in this manner, by issuing a termination request (step S10), all processing is terminated.

As described above, the centralized network monitoring device of present invention is configured so that the fault occurrence statuses of each of the devices being monitored and the intermediate monitoring devices under which these fault state devices being monitored are located are stored into tables, and further configured so that when a display screen is selected based on a map information file, the collected number of faults for each device is displayed in accordance with the above-described fault occurrence status table, so that it is possible to accurately determine the current fault states of each device at each heirarchical level in the network from the display screen.

By providing a verification status table into which is stored not only whether or not detailed fault information for the devices being monitored has been verified, but also the associated upstream intermediate monitoring device, it is possible to display, based on the verification status table, whether or not the faults at each device of each heirarchical level of the network have been verified, thereby enabling a distinction between already verified faults and yet-to-be-verified faults, making it possible to eliminate unnecessary verification operations.

In addition, because not only is the existence of a fault state device not within the display screen displayed on that display screen, but also the display screen size can be changed so that that fault state device is displayed on the display screen, it is possible for the operator to know of the existence of an occurrence of a fault in a device even if that device is not shown on the display screen.

What is claimed is:

1. A centralized network monitoring device for use in a network which monitors devices via intermediate monitoring devices by means of polling, comprising:

polling means for collecting respective fault status of each of monitored devices via intermediate monitoring devices upstream from each of the devices being monitored;

means for storing the respective fault status of each said monitored device collected by said polling means, said means for storing including a fault occurrence status table wherein the respective fault status is stored with correspondence established, by said polling means, with the intermediate monitoring devices upstream from each of the devices being monitored;

displaying means corresponding to the polling means for displaying a plurality of display screens which correspond to hierarchic levels of the devices to be monitored, respectively, in the network;

means including a map information file for storing an address and coordinates of each said monitored device located on maps of each of the plurality of display screens that correspond to the hierarchic levels;

means including a verification status table for storing data indicating whether or not detailed fault information for devices being monitored corresponding to upstream intermediate monitoring devices has been verified;

wherein said display means is selected with a desired screen from said plurality of screens and displays said desired screen based on said information in said map information file;

wherein a number of collected faults of each of said monitored devices is displayed on said selected screen in accordance with information on said fault occurrence status table; and whether or not detailed fault information for each said monitored device has been verified is displayed on the selected display screen in accordance with information on said verification status table.

2. A centralized network monitoring device according to claim 1, wherein said selected screen is displayed in an overlapping manner, and wherein any of the displayed frames can be selected for foreground display with a single action.

3. A centralized network monitoring device according to claim 2, wherein the existence of a fault state in a monitored device, although not within said desired screen is displayed within said desired screen.

4. A centralized network monitoring device according to claim 3, wherein the size of said display screen can be changed so that a monitored device with a fault state is displayed within said desired screen.

5. A centralized network monitoring device according to claim 1, wherein the existence of a fault state in a monitored device, although not within said desired screen is displayed within said desired screen.

6. A centralized network monitoring device according to claim 5, wherein the size of said display screen can be changed so that a monitored device with a fault state is displayed within said desired screen.

* * * * *